US012601812B2

(12) United States Patent
Haratake et al.

(10) Patent No.: US 12,601,812 B2
(45) Date of Patent: Apr. 14, 2026

(54) VEHICLE BODY STRUCTURE QUALITY EVALUATION DEVICE AND VEHICLE BODY STRUCTURE QUALITY EVALUATION METHOD

(71) Applicant: HONDA MOTOR CO., LTD., Tokyo (JP)

(72) Inventors: Daiki Haratake, Saitama (JP); Kento Takaoka, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 455 days.

(21) Appl. No.: 18/063,657

(22) Filed: Dec. 8, 2022

(65) Prior Publication Data

US 2023/0184892 A1     Jun. 15, 2023

(30) Foreign Application Priority Data

Dec. 9, 2021     (JP) ................................. 2021-200415

(51) Int. Cl.
    *G01S 7/41*          (2006.01)
    *G01S 13/931*        (2020.01)
(52) U.S. Cl.
    CPC .............. *G01S 7/41* (2013.01); *G01S 13/931* (2013.01)
(58) Field of Classification Search
    CPC .......... G01S 7/41; G01S 13/931; G01S 13/42; G01S 13/86; G01S 13/88
    See application file for complete search history.

(56) References Cited

U.S. PATENT DOCUMENTS

| | | | | |
|---|---|---|---|---|
| 9,614,279 B2 * | 4/2017 | McDevitt | ............... | H01Q 3/267 |
| 11,269,053 B2 * | 3/2022 | Pietsch | ................. | G01S 13/931 |
| 11,605,000 B2 * | 3/2023 | Herman | ................... | G06N 3/09 |
| 11,874,396 B2 * | 1/2024 | Maekawa | ............... | G01S 13/40 |
| 12,025,695 B2 * | 7/2024 | Sahara | ................. | G01S 13/347 |

(Continued)

FOREIGN PATENT DOCUMENTS

| | | |
|---|---|---|
| CN | 107250834 A | 10/2017 |
| CN | 107450072 A | 12/2017 |

(Continued)

OTHER PUBLICATIONS

Office Action issued Jun. 18, 2025 in the CN Patent Application No. 202211572705.1.

*Primary Examiner* — Vladimir Magloire
*Assistant Examiner* — Kimberly Jenkins
(74) *Attorney, Agent, or Firm* — CKC & Partners Co., LLC

(57)          ABSTRACT
An evaluation device (1) evaluates a quality of a bumper (3) in a vehicle including a radar (2) that detects a target (T) by irradiating an outside of a vehicle body (B) with an electromagnetic wave along an optical axis and the bumper (3) that shields the radar (2). The evaluation device (1) includes an intensity parameter measurer (11) that measures an intensity parameter value of the reflected wave passing through the bumper (3) and received from the target (T) by the radar (2), an angle information acquirer (12) that acquires angle information on an angle of a direction of arrival of the reflected wave from the target (T) with respect to the optical axis; and a quality evaluator (15) that evaluates the quality of the bumper (3), based on the intensity parameter value, a predetermined reference value for the intensity parameter value, and the angle information.

15 Claims, 3 Drawing Sheets

(56)     References Cited

U.S. PATENT DOCUMENTS

| 2017/0350970 | A1 |   | 12/2017 | Saito |  |
|---|---|---|---|---|---|
| 2018/0120416 | A1 |   | 5/2018 | Kitamura |  |
| 2019/0071074 | A1 | * | 3/2019 | Gokan | G01S 13/931 |
| 2020/0049814 | A1 | * | 2/2020 | Neidhardt | G01S 7/4026 |
| 2020/0172011 | A1 | * | 6/2020 | Acervo | B60R 21/0134 |
| 2021/0270962 | A1 | * | 9/2021 | You | G01S 13/42 |
| 2021/0349183 | A1 | * | 11/2021 | Lee | G01S 7/40 |
| 2021/0349209 | A1 | * | 11/2021 | Lee | G01S 13/931 |

FOREIGN PATENT DOCUMENTS

| CN |   | 113625279 | A |   | 11/2021 |  |  |
|---|---|---|---|---|---|---|---|
| JP |   | 2006250927 | A | * | 9/2006 |  |  |
| JP |   | 2006275942 | A |   | 10/2006 |  |  |
| JP |   | 5616693 | B2 | * | 10/2014 |   | G01S 13/08 |
| JP |   | 2017215236 | A |   | 12/2017 |  |  |
| JP |   | 2021139730 | A |   | 9/2021 |  |  |
| WO | WO-2014076875 | A1 | * | 5/2014 |   | G01S 17/936 |

* cited by examiner

$\sigma[m^2]$

ELEVATION ANGLE OR
AZIMUTH ANGLE [rad]

VEHICLE BODY STRUCTURE QUALITY EVALUATION DEVICE AND VEHICLE BODY STRUCTURE QUALITY EVALUATION METHOD

This application is based on and claims the benefit of priority from Japanese Patent Application No. 2021-200415, filed on 9 Dec. 2021, the content of which is incorporated herein by reference.

BACKGROUND OF THE INVENTION

Field of the Invention

The present invention relates to a vehicle body structure quality evaluation device and a vehicle body structure quality evaluation method. More specifically, the present invention relates to a vehicle body structure quality evaluation device and a vehicle body structure quality evaluation method for evaluating a quality of a vehicle body structure in a vehicle including a detector and vehicle body structure that shield the detector from a target.

Related Art

In recent years, vehicles are being equipped with driving support functions and automatic driving functions, for example, adaptive cruise control and automatic braking systems in order to improve the convenience of public transportation. In order to realize the driving support functions and the automatic driving functions, the vehicle is equipped with a detector such as a radar or a lidar that detects the external target by transmitting and receiving electromagnetic waves. In many cases, such a detector is attached to the vehicle body while being covered with a bumper, for example, in order to protect it from external impact and dirt. However, when a coating film formed on the design surface of the bumper is thicker than necessary, the electromagnetic waves passing through the bumper from the detector and irradiated to the external target and the reflected waves passing through the bumper from the external target and received by the detector may be reduced in intensity, and the accuracy may decrease.

Japanese Unexamined Patent Application, Publication No. 2017-215236 discloses an invention relating to a device for evaluating the presence or absence of an abnormality in a bumper, which is a reduction factor in accuracy of a detector. In the invention disclosed in Japanese Unexamined Patent Application, Publication No. 2017-215236, the abnormality in the bumper is evaluated by transmitting a transmission wave from a radar module provided inside the bumper to the outside of the bumper, receiving an object-reflected wave that is a reflection of the transmission wave by an external target, a bumper-reflected-wave that is a reflection of the transmission wave by the bumper, and a transmission and reception leak of the transmission wave, and comparing a reception level of the received waves including the bumper-reflected-wave and the transmission and reception leak with a threshold.

Patent Document 1: Japanese Unexamined Patent Application, Publication No. 2017-215236

SUMMARY OF THE INVENTION

By the way, it is known that the intensity of the reflected wave as an electromagnetic wave from the target varies depending on an angle formed by a direction of arrival of the reflected wave and an optical axis of the detector. However, according to the invention disclosed in Japanese Unexamined Patent Application, Publication No. 2017-215236, an influence of the angle on the intensity of the reflected wave is not taken into consideration, and thus the accuracy of evaluation may be deteriorated.

An object of the present invention is to provide a vehicle body structure quality evaluation device and a vehicle body structure quality evaluation method capable of evaluating a quality of a vehicle body structure, which protects a detector, with higher accuracy in order to prevent deterioration in detection accuracy of an in-vehicle detector that contributes to the improvement of traffic safety.

(1) The present invention provides a vehicle body structure quality evaluation device (for example, an evaluation device 1 to be described below) that evaluates a quality of a vehicle body structure (for example, a bumper 3 to be described below) in a vehicle including a detector (for example, a radar 2 to be described below) that detects a target (for example, a target T to be described below) by irradiating an outside of a vehicle body (for example, a vehicle body B to be described below) with an electromagnetic wave along an optical axis and receiving a reflected wave of the electromagnetic wave from the target and the vehicle body structure that is provided on the vehicle body to shield the detector from the target, the vehicle body structure quality evaluation device including: an intensity parameter measurer (for example, an intensity parameter measurer 11 to be described below) that measures an intensity parameter value of the reflected wave passing through the vehicle body structure and received from the target by the detector; an angle information acquirer (for example, an angle information acquirer 12 to be described below) that acquires angle information on an angle of a direction of arrival of the reflected wave from the target with respect to the optical axis; and a quality evaluator (for example, a quality evaluator 15 to be described below) that evaluates the quality of the vehicle body structure, based on the intensity parameter value, a predetermined reference value, and the angle information acquired by the angle information acquirer.

(2) In this case, preferably, the quality evaluator evaluates the quality of the vehicle body structure during running of the vehicle using a moving object, a traffic participant, or an object existing around the vehicle as the target.

(3) In this case, preferably, the quality evaluator compensates the intensity parameter value based on the angle information to calculate a compensation value, evaluates that the vehicle body structure is normal when a difference value between the compensation value and the reference value is less than a predetermined threshold, and evaluates that the vehicle body structure is abnormal when the difference value is equal to or more than the threshold.

(4) In this case, preferably, the quality evaluator compensates the intensity parameter value to a larger value as an absolute value of an elevation angle or an azimuth angle of the direction of arrival with respect to the optical axis increases.

(5) In this case, preferably, the vehicle body structure quality evaluation device further includes a temperature information acquirer (for example, a temperature information acquirer 13 to be described below) that acquires temperature information on a temperature of the detector, and the quality evaluator compensates the intensity parameter value based on the angle information and the temperature information to calculate the compensation value.

(6) In this case, preferably, the quality evaluator compensates the intensity parameter value to a larger value when the temperature of the detector is higher than a reference temperature, and compensates the intensity parameter value to a smaller value when the temperature of the detector is lower than the reference temperature.

(7) In this case, preferably, the vehicle body structure quality evaluation device further includes a distance information acquirer (for example, a distance information acquirer 14 to be described below) that acquires distance information on a distance from the vehicle to the target, and the quality evaluator compensates the intensity parameter value based on the angle information and the distance information to calculate the compensation value.

(8) The present invention provides a vehicle body structure quality evaluation method of evaluating a quality of a vehicle body structure in a vehicle including a detector that detects a target by irradiating an outside of a vehicle body with an electromagnetic wave along an optical axis and receiving a reflected wave of the electromagnetic wave from the target and the vehicle body structure that is provided on the vehicle body to shield the detector from the target, the vehicle body structure quality evaluation method including: a step of measuring an intensity parameter value of the reflected wave passing through the vehicle body structure and received from the target by the detector; a step of acquiring angle information on an angle of a direction of arrival of the reflected wave from the target with respect to the optical axis; and a step of evaluating the quality of the vehicle body structure, based on the intensity parameter value, a predetermined reference value, and the angle information.

(1) The vehicle body structure quality evaluation device according to the present invention measures the intensity parameter value that increases or decreases according to the intensity of the reflected wave passing through the vehicle body structure and received from the target by the detector, acquires the angle information on the angle of the direction of arrival of the reflected wave with respect to the optical axis, and evaluates the quality of the vehicle body structure based on the intensity parameter value, the predetermined reference value for the intensity parameter value, and the angle information. Therefore, according to the present invention, since it is possible to consider the influence of the angle of the direction of arrival of the reflected wave with respect to the optical axis on the intensity of the reflected wave, the evaluation device 1 can evaluate the quality of the vehicle body structure with higher accuracy compared with the related art at the time of evaluating the quality of the vehicle body structure. Further, this can prevent the deterioration in detection accuracy of the in-vehicle detector due to defects of the vehicle body structure, thereby improving traffic safety.

(2) According to the present invention, since the vehicle body structure quality evaluation device evaluates the quality of the vehicle body structure during running of the vehicle using the moving object, the traffic participant, or the object existing around the vehicle as the target, a user can grasp whether an abnormality occurs in the vehicle body structure during running of the vehicle. Accordingly, since the user can immediately grasp the abnormality in the vehicle body structure that occurs when the user paints the vehicle body structure by himself or herself, for example, thereby improving traffic safety.

(3) According to the present invention, the vehicle body structure quality evaluation device compensates the intensity parameter value based on the angle information between the direction of arrival and the optical axis to calculate the compensation value, and evaluates the quality of the vehicle body structure based on the comparison of the difference value between the compensation value and the predetermined reference value with the threshold, whereby it is possible to evaluate the quality of the vehicle body structure with high accuracy in consideration of the influence of the angle between the direction of arrival of the reflected wave and the optical axis on the intensity of the reflected wave, thereby improving traffic safety.

(4) According to the present invention, the vehicle body structure quality evaluation device compensates the intensity parameter value to a larger value as the absolute value of the elevation angle or the azimuth angle of the direction of arrival with respect to the optical axis increases, and thus the influence of the angle of the direction of arrival with respect to the optical axis on the intensity of the reflected wave can be appropriately reduced, whereby it is possible to evaluate the quality of the vehicle body structure with high accuracy regardless of the direction of the direction of arrival, thereby improving traffic safety.

(5) According to the present invention, the vehicle body structure quality evaluation device acquires the temperature information on the temperature of the detector, and compensates the intensity parameter value of the reflected wave based on the angle information and the temperature information to calculate the compensation value, whereby it is possible to evaluate the quality of the vehicle body structure with high accuracy in consideration of the influence of the temperature of the detector on the intensity of the reflected wave in addition to the angle between the direction of arrival and the optical axis, thereby improving traffic safety.

(6) According to the present invention, the vehicle body structure quality evaluation device compensates the intensity parameter value to a larger value when the temperature of the detector is higher than the reference temperature and compensates the intensity parameter value to a smaller value when the temperature of the detector is lower than the reference temperature, and thus the influence of the temperature of the detector on the intensity of the reflected wave can be appropriately reduced, whereby it is possible to evaluate the quality of the vehicle body structure with high accuracy regardless of the temperature of the detector, thereby improving traffic safety.

(7) According to the present invention, the vehicle body structure quality evaluation device acquires the distance information on the distance from the vehicle to the target, and compensates the intensity parameter value of the reflected wave based on the angle information and the distance information to calculate the compensation value, whereby it is possible to evaluate the quality of the vehicle body structure with high accuracy in consideration of the influence of the distance to the target on the intensity of the reflected wave in addition to the angle between the direction of arrival and the optical axis, thereby improving traffic safety.

(8) The vehicle body structure quality evaluation method according to the present invention includes measuring the intensity parameter value that increases or decreases according to the intensity of the reflected wave passing through the vehicle body structure and received from the target by the detector, acquiring the angle information on the angle of the direction of arrival of the reflected wave with respect to the optical axis, and evaluating the quality of the vehicle body structure based on the intensity parameter value, the predetermined reference value for the intensity parameter value, and the angle information. Therefore, according to the present invention, since it is possible to consider the influence of the angle of the direction of arrival of the reflected wave with respect to the optical axis on the intensity of the reflected wave, the quality of the vehicle body structure can be evaluated with higher accuracy compared with the related art, thereby improving traffic safety.

BRIEF DESCRIPTION OF THE DRAWINGS

FIG. 1 is a diagram schematically showing a configuration of a part of a vehicle body of a vehicle on which an evaluation device according to an embodiment of the present invention is mounted;

FIG. 2 is a view schematically showing dependency of a radar cross section on an elevation angle and an azimuth angle.

DETAILED DESCRIPTION OF THE INVENTION

Figure 3:
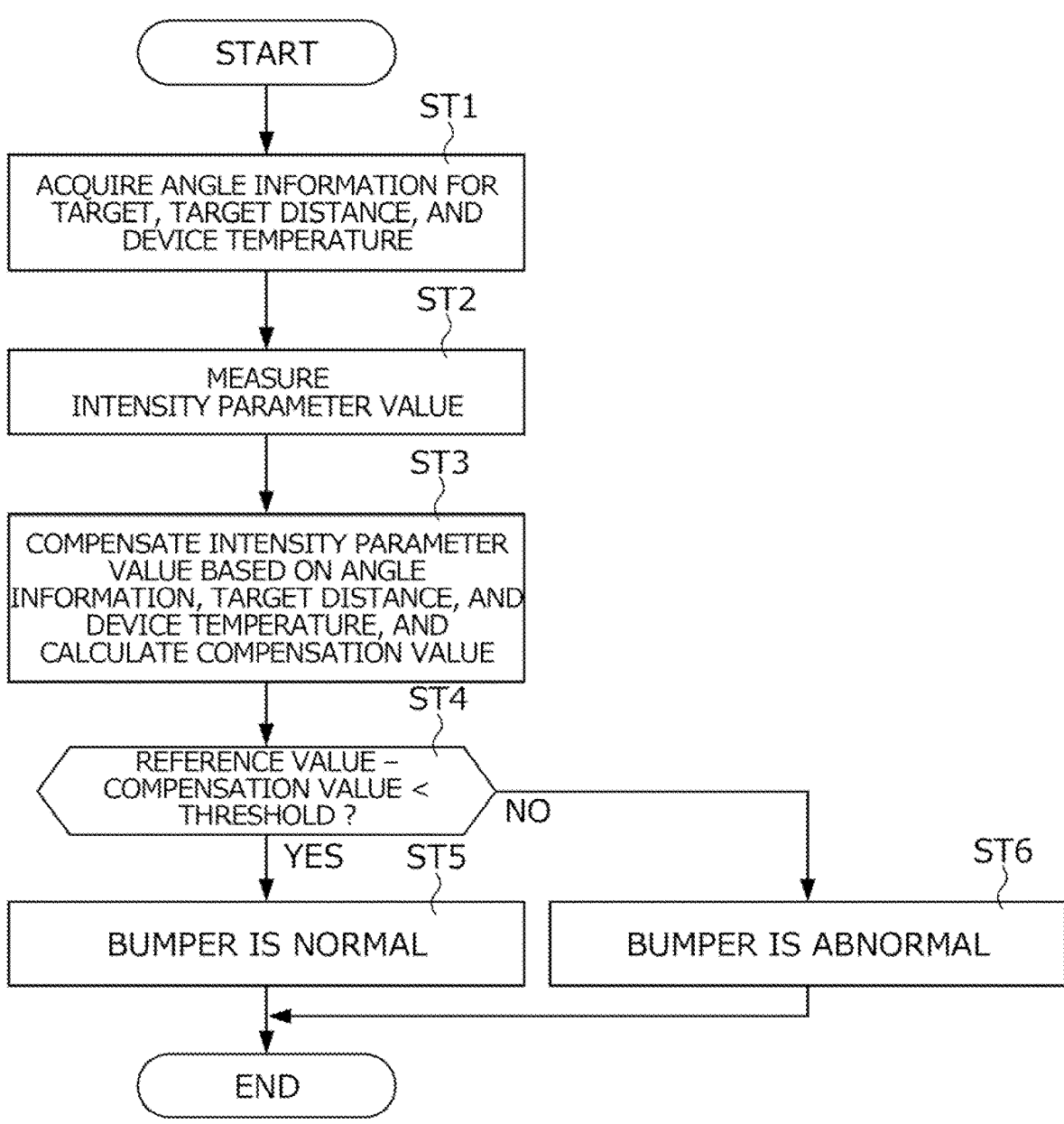
FIG. 3 is a flowchart showing a specific procedure of an evaluation method of evaluating a quality of a bumper with the evaluation device.

A vehicle body structure quality evaluation device and a vehicle body structure quality evaluation method according to an embodiment of the present invention will be described below with reference to the drawings.

Figure 1:
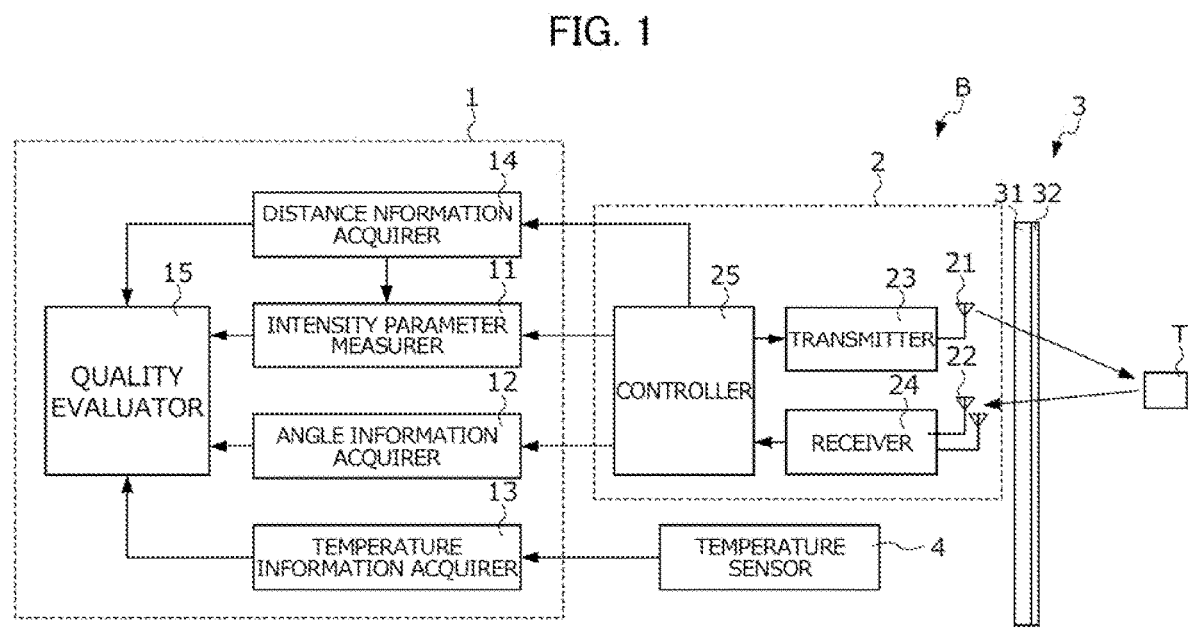

FIG. 1 is a diagram schematically showing a configuration of an evaluation device 1 according to the present embodiment and a part of a vehicle body B of a vehicle on which the evaluation device 1 is mounted.

The vehicle body B includes a radar 2 as a detector that detects a target T outside the vehicle body B, a bumper 3 as a vehicle body structure, a temperature sensor 4 that detects a temperature of the radar 2 and its surroundings, and an evaluation device 1 that evaluates a quality of the bumper 3 using the radar 2.

The bumper 3 has a plate shape, and is provided on the vehicle body B so as to shield the radar 2 from the target T. The bumper 3 includes a plate-like base member 31 made of resin, for example, and a paint layer 32 formed on an outer design surface of the base member 31.

The radar 2 is provided inside the bumper 3 in the vehicle body B. The radar 2 irradiates the outside of the vehicle body B with an electromagnetic wave (for example, a millimeter wave) along an optical axis and receives a reflected wave of the electromagnetic wave from the target T, thereby detecting the target T.

The radar 2 includes a transmission antenna 21, reception antennas 22a and 22b, a transmitter 23, a receiver 24, and a controller 25. In the present embodiment, a case will be described using a so-called monopulse type radar 2 that detects an angle of the target T with respect to the optical axis based on a phase difference or an amplitude difference of signals received by the plurality of reception antennas 22a and 22b, but the present invention is not limited thereto. For example, a mechanical scan type radar or an electronic scan type radar may be used.

The transmitter 23 modulates a high frequency signal supplied from the controller 25 to generate a harmonic pulse signal, and supplies the generated signal to the transmission antenna 21. The transmission antenna 21 irradiates the outside of the vehicle body B with the harmonic pulse signal as an electromagnetic wave, which is supplied from the transmitter 23, along the optical axis.

Each of the reception antennas 22a and 22b receives the reflected waves of the electromagnetic waves irradiated from target T by the transmission antenna 21, and supplies the reflected waves as electrical signals to the receiver 24. The receiver 24 demodulates the electrical signals supplied from the reception antennas 22a and 22b with harmonic signals supplied from the controller 25, and supplies the demodulated signals to the controller 25.

The controller 25 performs known signal processing such as A/D conversion processing or DFT on the signals supplied from the receiver 24 to detect an angle of the target T with respect to the optical axis, a distance between the radar 2 and the target T, and a speed of the target T, and transmits information on the angle, distance, and speed to a vehicle control device (not shown).

As described above, since the electromagnetic waves irradiated from the radar 2 and the reflected waves from the target T received by the radar 2 pass through the bumper 3, when an abnormality occurs in the bumper 3 (for example, when the thickness of the paint layer 32 is uneven, or when foreign matters adhere to the bumper 3), the detection accuracy of the radar 2 for the target T may be reduced.

In order to prevent the detection accuracy of the radar 2 from reducing due to the abnormality in the bumper 3, the evaluation device 1 uses the information obtained at the time of detection of the target T in the radar 2 to evaluate the quality of the bumper 3, that is, the presence or absence of the abnormality in the bumper 3.

A case will be described in the present embodiment in which assuming that the evaluation device 1 evaluates the quality of the bumper 3 during running of the vehicle (including during a temporary stop), moving objects, traffic participants, or objects existing around the running vehicle are used as the target T for the radar 2, but the present invention is not limited thereto. For example, in a case of determining the quality of the bumper 3 at an inspection station during vehicle inspection, an object such as a corner reflector or a sphere installed at the inspection station may be used as the target T for the radar 2.

The evaluation device 1 includes an intensity parameter measurer 11, an angle information acquirer 12, a temperature information acquirer 13, a distance information acquirer 14, and a quality evaluator 15.

The angle information acquirer 12 acquires angle information on an angle of a direction of arrival (that is, a direction of target T viewed from the radar 2) of the reflected wave from the target T with respect to the optical axis of the radar 2, and transmits the acquired angle information to the quality evaluator 15. Here, the angle information acquired by the angle information acquirer 12 includes at least one selected from an elevation angle [rad], which is an angle in a vertical direction of the target T with respect to the optical axis of the radar 2, and an azimuth angle (rad) which is an angle in a horizontal direction of the target T with respect to the optical axis. A case will be described in the present embodiment in which the angle information includes both of the elevation angle and the azimuth angle, but the present invention is not limited thereto.

A case will be described in the present embodiment in which assuming that the quality of the bumper 3 is evaluated during running of the vehicle, the angle information acquirer 12 uses the detection result of the radar 2 to acquire the angle information of the target T viewed from the radar 2, but the present invention is not limited thereto. The angle information acquirer 12 may use the detection result of a detector, which is mounted on the vehicle and is different from the radar 2, to acquire the angle information of the target T viewed from the radar 2. Further, in the case of determining the quality of the bumper 3 at the inspection station during vehicle inspection, as described above, when the elevation angle and the azimuth angle of the target T viewed from the radar 2 are known setting angles, the angle information acquirer 12 may acquire these setting angles as angle information.

The temperature information acquirer 13 acquires a device temperature [° C.] corresponding to the temperature of the radar 2, and transmits the acquired device temperature to the quality evaluator 15. The temperature information acquirer 13 acquires the device temperature using the detection signal of the temperature sensor 4, for example.

The distance information acquirer 14 acquires a target distance [m] corresponding to the distance from the radar 2 to the target T, and transmits the acquired target distance to the intensity parameter measurer 11 and the quality evaluator 15. A case will be described in the present embodiment in which assuming that the quality of the bumper 3 is evaluated during running of the vehicle, the distance information acquirer 14 acquires the target distance using the detection result of the radar 2, but the present invention is not limited thereto. The distance information acquirer 14 may use the detection result of the detector, which is mounted on the vehicle and is different from the radar 2, to acquire the target distance. Further, in the case of determining the quality of the bumper 3 at the inspection station during vehicle inspection, as described above, when the distance from the radar 2 to the target T is a known setting distance, the distance information acquirer 14 may acquire the setting distance as a target distance.

The intensity parameter measurer 11 measures an intensity parameter value of the reflected wave passing through the bumper 3 and received from the target T by the radar 2, based on the information obtained from the radar 2 by the detection of the target T in the radar 2, and transmits the acquired intensity parameter value to the quality evaluator 15. Here, the intensity parameter is a parameter that increases or decreases depending on the intensity of the reflected wave passing through the bumper 3 and received from the target T by the radar 2. A case will be described in the present embodiment in which the intensity parameter of the reflected wave uses a radar cross section σ [m$^2$] corresponding to a measure of ability to reflect the electromagnetic waves in the direction of the antenna at the time of reception of the electromagnetic waves irradiated by the radar, but the present invention is not limited thereto. The intensity parameter may be any parameter that increases or decreases depending on the intensity of the reflected wave.

More specifically, the intensity parameter measurer 11 calculates the intensity parameter value using Formula (1) below, based on the information acquired from the radar 2 by the detection of the target T in the radar 2 and a predetermined value.

$$\sigma = \frac{(4\pi)^3 R^4 P_r}{G_t G_r \lambda^2 A P_t} \tag{1}$$

In Formula (1) above, "R" corresponds to the target distance [m] from the radar 2 to the target T, and the value acquired by the distance information acquirer 14 described above is used in the intensity parameter measurer 11, for example. In Formula (1) above, "Pt", "Pr", "Gt", "Gr", "λ", and "A" correspond to transmission power [W] of the radar 2 [W], received power. [W] of the radar 2, a gain of the transmission antenna 21 of the radar 2, a gain of the reception antenna 22 of the radar 2, a wavelength [m] of the transmitted wave of the radar 2, and attenuation [dB], respectively, and the information acquired from the radar 2 by the detection of the target T in the radar 2 and the predetermined value are used in the intensity parameter measurer 11.

The radar cross section defined by Formula (1) above varies depending on materials, shapes, and sizes of the target T. For this reason, it is preferable to use the target T that is as close as possible in material, shape, and size to a reference target which will be described below.

The quality evaluator 15 evaluates the quality of the bumper 3, based on the intensity parameter value measured by the intensity parameter measurer 11, a predetermined reference value for the intensity parameter value, the angle information acquired by the angle information acquirer 12, the device temperature acquired by the temperature information acquirer 13, and the target distance acquired by the distance information acquirer 14.

More specifically, the quality evaluator 15 calculates a compensation value of the intensity parameter value by compensating the intensity parameter value based on the angle information, the device temperature, and the target distance, evaluates that the bumper 3 is normal (that is, the quality of the bumper 3 is good) when a difference value (=reference value−compensation value) between the compensation value and the reference value is less than a predetermined threshold, and evaluates that the bumper 3 is abnormal (that is, the quality of bumper 3 is poor) when the difference value is equal to or more than the threshold. A case will be described in the present embodiment in which the quality evaluator 15 compensates the intensity parameter value based on three parameters of the angle information, the device temperature, and the target distance, but the present invention is not limited thereto. The quality evaluator 15 may compensate the intensity parameter value based only on the angle information among the three parameters, may compensate the intensity parameter value based on the angle information and the device temperature, and may compensate the intensity parameter value based on the angle information and the target distance.

Further, the quality evaluator 15 uses, as the reference value, an intensity parameter value obtained when the radar 2 detects a predetermined reference target under a predetermined reference measurement condition. In the present embodiment, the temperature of the radar 2 is set to a predetermined reference temperature, the distance between the radar 2 and the reference target is set to a predetermined reference distance, and the reference measurement condition is to set the reference target on the optical axis of the radar 2 (that is, both of the elevation angle and the azimuth angle of the reference target viewed from the radar 2 are 0 [rad]). At this time, it is preferable to detach the bumper 3 from the vehicle body and to remove the shielding object between the radar 2 and the reference target.

Further, when the quality of the bumper 3 is evaluated during running of the vehicle as described above, for example, an intensity parameter value obtained under the reference measurement condition described above in the inspection at the time of manufacturing the vehicle may be used as the reference value. In addition, when the quality of the bumper 3 is evaluated at the inspection station at the time of vehicle inspection, an intensity parameter value is measured under the reference measurement condition described above at the inspection station each time, and the quality of the bumper 3 may be evaluated using such an intensity parameter value as the reference value.

Further, the radar cross section as an intensity parameter defined by Formula (1) above varies depending on actual measurement conditions characterized by the angle information, the device temperature, and the target distance. For this reason, the intensity parameter value measured by the intensity parameter measurer 11 cannot be compared with the reference value measured under the reference measurement condition different from the actual measurement condition. Therefore, the quality evaluator 15 compensates the intensity parameter value according to a procedure described below based on the angle information, the device temperature, and the target distance, thereby removing a deviation, from the reference value, of the intensity parameter value caused by the difference between the actual measurement condition and the reference measurement condition.

Figure 2:
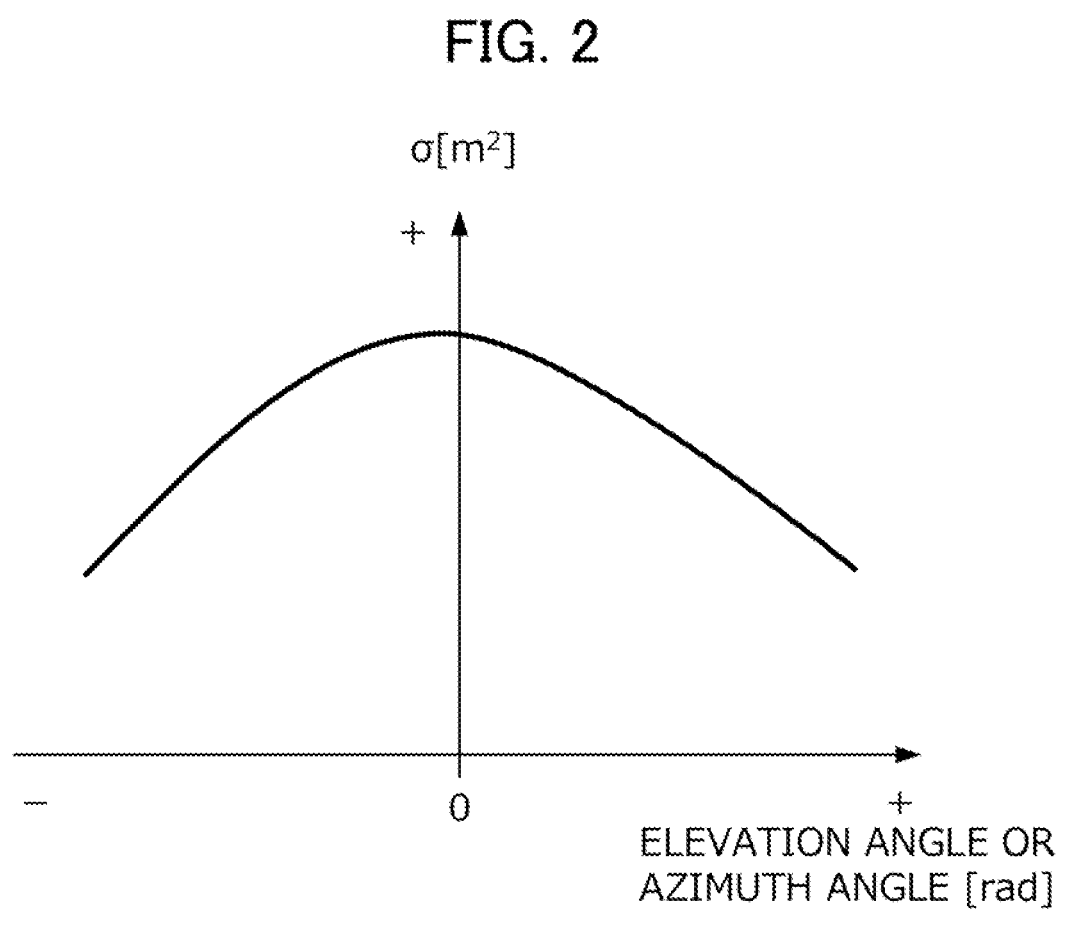

FIG. 2 is a view schematically showing dependency of the radar cross section on the elevation angle and the azimuth angle. As shown in FIG. 2, the radar cross section is maximized when both of the elevation angle and the azimuth angle of the target with respect to the optical axis are 0 (rad), and tends to decrease as the elevation angle or the azimuth angle departs from 0 (rad). Therefore, the quality evaluator 15 compensates the intensity parameter value to a larger value as an absolute value of the elevation angle or the azimuth angle increases. Thus, it is possible to remove the deviation, from the reference value, of the intensity parameter value caused by the difference between the actual measurement condition and the reference measurement condition, particularly, the difference in the elevation angle and the azimuth angle.

Further, when the temperature of the radar 2 changes, the gain of the antenna of the radar 2 changes. For this reason, as the temperature of the radar 2 becomes higher, the radar cross section tends to be smaller. Therefore, the quality evaluator 15 compensates the intensity parameter value to a larger value when the device temperature is higher than the reference temperature, and compensates the intensity parameter value to a smaller value when the device temperature is lower than the reference temperature. More specifically, the quality evaluator 15 compensates the intensity parameter value to a larger value when the device temperature is higher than the reference temperature as the difference between the device temperature and the reference temperature (device temperature−reference temperature) increases, and compensates the intensity parameter value to a smaller value as the difference between the reference temperature and the device temperature (reference temperature−device temperature) increases when the device temperature is lower than the reference temperature. Thus, it is possible to remove the deviation of the intensity parameter value from the reference value due to the difference between the actual measurement condition and the reference measurement condition, in particular, the difference in the temperature of the radar 2.

In addition, the radar cross section varies depending on the distance between the radar 2 and the target. Therefore, the quality evaluator 15 searches for a predetermined map based on the difference between the target distance and the reference distance, and thus compensates the intensity parameter value so as to remove the deviation of the intensity parameter value from the reference value due to the difference between the actual measurement condition and the reference measurement condition, in particular, the difference in the distance between the radar 2 and the target.

Further, the radar cross section varies depending on the material, shape, and size of the target. For this reason, when the evaluation device 1 evaluates the quality of the bumper 3 during running of the vehicle, it is preferable for the target T for the radar 2 to use any of moving objects, traffic participants, and objects existing around the running vehicle that is as close as possible in at least one of material, shape, and size to the reference target.

In addition, since the radar cross section varies depending on the material, shape, and size of the target described above, the intensity parameter value may be measured under the reference measurement condition using a plurality of types of reference targets having different materials, shapes, and sizes, and a reference value may be set for each reference target. In this case, the evaluation device 1 may evaluate the quality of the bumper 3 using the reference value for the reference target closest in material, shape, and size to the target T selected to evaluate the quality of the bumper 3.

The case has been described above in which the quality evaluator 15 compensates the intensity parameter value based on the angle information, the device temperature, and the target distance, but the present invention is not limited thereto. The quality evaluator 15 may evaluate the quality of the bumper 3 based on the comparison between the measured intensity parameter value and the reference value and calculate the compensation value of the reference value by compensating the reference value based on the angle information, the device temperature, and the target distance, and may evaluate the quality of the bumper 3 on the comparison of the difference value (=compensation value of the reference value−intensity parameter value) between the measured intensity parameter value and the compensation value with the predetermined threshold. However, in this case, the direction of compensation of the reference value is reverse to the direction of compensation of the intensity parameter value as described above.

FIG. 3 is a flowchart showing a specific procedure of an evaluation method of evaluating the quality of the bumper 3 with the evaluation device 1. Processing shown in FIG. 3 starts when the radar 2 recognizes the target T.

First, in Step ST1, the angle information acquirer 12, the distance information acquirer 14, and the temperature information acquirer 13 acquire the angle information with respect to the target T, a target distance, and a device temperature, respectively, and the process proceeds to Step ST2.

In Step ST2, the intensity parameter measurer 11 measures an intensity parameter value of the reflected wave passing through the bumper 3 and received from the target T by the radar 2, based on the information obtained from the radar 2 by the detection of the target T in the radar 2, and the process proceeds to Step ST3.

In Step ST3, the quality evaluator 15 compensates the intensity parameter value measured in Step ST2, based on the angle information, target distance, and the device temperature acquired in Step ST1 to calculate a compensation value of the intensity parameter value, and the process proceeds to Step ST4.

In Step ST4, the quality evaluator 15 calculates a difference value (=reference value−compensation value) between the compensation value calculated in Step ST3 and a predetermined reference value, and evaluates whether the difference value is less than the predetermined reference value. The quality evaluator 15 evaluates that the bumper 3 is normal (see Step ST5) when the evaluation result in Step ST4 is YES (difference value<threshold) and evaluates that the bumper 3 is abnormal (see Step ST6) when the evaluation result is NO (difference value threshold), and the processing shown in FIG. 3 ends.

According to the evaluation device and the evaluation method of the bumper 3 of the present embodiment, the following effects are achieved.

(1) The evaluation device 1 measures the radar cross section as the intensity parameter value that increases or decreases according to the intensity of the reflected wave passing through the bumper 3 and received from the target T by the radar 2, acquires the angle information on the angle of the direction of arrival of the reflected wave with respect to the optical axis of the radar 2, and evaluates the quality of the bumper 3 based on the intensity parameter value, the predetermined reference value, and the angle information. Therefore, according to the evaluation device 1, since it is possible to consider the influence of the angle of the direction of arrival of the reflected wave with respect to the optical axis on the intensity of the reflected wave, the evaluation device 1 can evaluate the quality of the bumper 3 with higher accuracy compared with the related art at the time of evaluating the quality of the bumper 3. Further, this can prevent the deterioration in detection accuracy of the radar 2 due to defects of the bumper 3, thereby improving traffic safety.

(2) Since the evaluation device 1 evaluates the quality of the bumper 3 during running of the vehicle using the moving object, the traffic participant, or the object existing around the vehicle as the target T, a user can grasp whether an abnormality occurs in the bumper 3 during running of the vehicle. Accordingly, since the user can immediately grasp the abnormality in the bumper 3 that occurs when the user paints the bumper 3 by himself or herself, for example, thereby improving traffic safety.

(3) The evaluation device 1 compensates the intensity parameter value based on the angle information between the direction of arrival and the optical axis to calculate the compensation value, and evaluates the quality of the bumper 3 based on the comparison of the difference value between the compensation value and the predetermined reference value with the threshold, whereby it is possible to evaluate the quality of the bumper 3 with high accuracy in consideration of the influence of the angle between the direction of arrival of the reflected wave and the optical axis on the intensity of the reflected wave, thereby improving traffic safety.

(4) The evaluation device 1 compensates the intensity parameter value to a larger value as the absolute value of the elevation angle or the azimuth angle of the direction of arrival with respect to the optical axis increases, and thus the influence of the angle of the direction of arrival with respect to the optical axis on the intensity of the reflected wave can be appropriately reduced, whereby it is possible to evaluate the quality of the bumper 3 with high accuracy regardless of the direction of the direction of arrival, thereby improving traffic safety.

(5) The evaluation device 1 acquires the device temperature of the radar 2, and compensates the intensity parameter value of the reflected wave based on the angle information and the device temperature to calculate the compensation value, whereby it is possible to evaluate the quality of the bumper 3 with high accuracy in consideration of the influence of the device temperature of the radar 2 on the intensity of the reflected wave in addition to the angle between the direction of arrival and the optical axis, thereby improving traffic safety.

(6) The evaluation device 1 compensates the intensity parameter value to a larger value when the device temperature of the radar 2 is higher than the reference temperature and compensates the intensity parameter value to a smaller value when the device temperature of the radar 2 is lower than the reference temperature, and thus the influence of the device temperature of the radar 2 on the intensity of the reflected wave can be appropriately reduced, whereby it is possible to evaluate the quality of the bumper 3 with high accuracy regardless of the device temperature of the radar 2, thereby improving traffic safety.

(7) The evaluation device 1 acquires the target distance from the vehicle to the target T, and compensates the intensity parameter value of the reflected wave based on the angle information and the target distance to calculate the compensation value, whereby it is possible to evaluate the quality of the bumper 3 with high accuracy in consideration of the influence of the distance to the target T on the intensity of the reflected wave in addition to the angle between the direction of arrival and the optical axis, thereby improving traffic safety.

(8) The evaluation method according to the present embodiment includes measuring the radar cross section as the intensity parameter value that increases or decreases according to the intensity of the reflected wave passing through the bumper 3 and received from the target T by the radar 2, acquiring the angle information on the angle of the direction of arrival of the reflected wave with respect to the optical axis, and evaluating the quality of the bumper 3 based on the intensity parameter value, the predetermined reference value, and the angle information. Therefore, according to the evaluation method, since it is possible to consider the influence of the angle of the direction of arrival of the reflected wave with respect to the optical axis on the intensity of the reflected wave, the quality of the bumper 3 can be evaluated with higher accuracy compared with the related art, thereby improving traffic safety.

Although the embodiment of the present invention has been described above, the present invention is not limited thereto. Detailed configurations may be changed as appropriate within the scope of the present invention.

For example, the case has been described in the above-described embodiment in which assuming that the evaluation device 1 evaluates the quality of the bumper 3 during running of the vehicle, the evaluation device 1 is mounted on the vehicle, but the present invention is not limited thereto. When the quality of the bumper 3 is evaluated at the inspection station at the time of vehicle inspection as described above, the evaluation device 1 may be mounted on an inspection device separate from the vehicle.

What is claimed is:

1. A bumper quality evaluation device that evaluates a quality of a bumper in a vehicle including a detector that detects a target by irradiating an outside of a vehicle body with an electromagnetic wave along an optical axis and receiving a reflected wave of the electromagnetic wave from the target and the bumper that is provided on the vehicle body to shield the detector from the target, the bumper quality evaluation device comprising:

an intensity parameter measurer that measures an intensity parameter value of the reflected wave passing through the bumper and received from the target by the detector;

an angle information acquirer that acquires angle information on an angle of a direction of arrival of the reflected wave from the target with respect to the optical axis; and a quality evaluator that compensates the intensity parameter value based on the angle information to calculate a compensation value, evaluates that the bumper is normal when a difference value between the compensation value and a predetermined reference value is less than a predetermined threshold, and evaluates that the bumper is abnormal when the difference value is equal to or more than the threshold.

2. The bumper quality evaluation device according to claim 1, wherein the quality evaluator evaluates the quality of the bumper during running of the vehicle using a moving object, a traffic participant, or an object existing around the vehicle as the target.

3. The bumper quality evaluation device according to claim 1, wherein the quality evaluator compensates the intensity parameter value to a larger value as an absolute value of an elevation angle or an azimuth angle of the direction of arrival with respect to the optical axis increases.

4. The bumper quality evaluation device according to claim 1, wherein the quality evaluator compensates the intensity parameter value to a larger value as an absolute value of an elevation angle or an azimuth angle of the direction of arrival with respect to the optical axis increases.

5. The bumper quality evaluation device according to claim 1, further comprising a temperature information acquirer that acquires temperature information on a temperature of the detector, wherein
the quality evaluator compensates the intensity parameter value based on the angle information and the temperature information to calculate the compensation value.

6. The bumper quality evaluation device according to claim 5, wherein the quality evaluator compensates the intensity parameter value to a larger value when the temperature of the detector is higher than a reference temperature, and compensates the intensity parameter value to a smaller value when the temperature of the detector is lower than the reference temperature.

7. The bumper quality evaluation device according to claim 5, further comprising a distance information acquirer that acquires distance information on a distance from the vehicle to the target, wherein
the quality evaluator compensates the intensity parameter value based on the angle information and the distance information to calculate the compensation value.

8. The bumper quality evaluation device according to claim 1, further comprising a temperature information acquirer that acquires temperature information on a temperature of the detector, wherein
the quality evaluator compensates the intensity parameter value based on the angle information and the temperature information to calculate the compensation value.

9. The bumper quality evaluation device according to claim 8, wherein the quality evaluator compensates the intensity parameter value to a larger value when the temperature of the detector is higher than a reference temperature, and compensates the intensity parameter value to a smaller value when the temperature of the detector is lower than the reference temperature.

10. The bumper quality evaluation device according to claim 8, further comprising a distance information acquirer that acquires distance information on a distance from the vehicle to the target, wherein
the quality evaluator compensates the intensity parameter value based on the angle information and the distance information to calculate the compensation value.

11. The bumper quality evaluation device according to claim 1, further comprising a distance information acquirer that acquires distance information on a distance from the vehicle to the target, wherein
the quality evaluator compensates the intensity parameter value based on the angle information and the distance information to calculate the compensation value.

12. The bumper quality evaluation device according to claim 1, further comprising a distance information acquirer that acquires distance information on a distance from the vehicle to the target, wherein
the quality evaluator compensates the intensity parameter value based on the angle information and the distance information to calculate the compensation value.

13. A bumper quality evaluation method of evaluating a quality of a bumper in a vehicle including a detector that detects a target by irradiating an outside of a vehicle body with an electromagnetic wave along an optical axis and receiving a reflected wave of the electromagnetic wave from the target and the bumper that is provided on the vehicle body to shield the detector from the target, the bumper quality evaluation method comprising:
a step of measuring an intensity parameter value of the reflected wave passing through the bumper and received from the target by the detector;
a step of acquiring angle information on an angle of a direction of arrival of the reflected wave from the target with respect to the optical axis;
a step of calculating a compensation value by compensating the intensity parameter value based on the angle information;
a step of evaluating the bumper is normal when a difference value between the compensation value and a predetermined reference value is less than a predetermined threshold; and
a step of evaluating the bumper is abnormal when the difference value is equal to or more than the threshold.

14. The bumper quality evaluation device according to claim 1, wherein the bumper includes a base member and a paint layer or an adhesive substance.

15. The bumper quality evaluation method according to claim 13, wherein the bumper includes a base member and a paint layer or an adhesive substance.

* * * * *